(12) United States Patent
Mohanty et al.

(10) Patent No.: US 11,509,260 B1
(45) Date of Patent: Nov. 22, 2022

(54) RECLAMATION OF ENERGY LEAKING FROM WAVEGUIDES (71) Applicant: Meta Platforms Technologies, LLC, Menlo Park, CA (US)

(72) Inventors: Nihar Ranjan Mohanty, Snoqualmie, WA (US); Ningfeng Huang, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 159 days.

(21) Appl. No.: 16/171,115

(22) Filed: Oct. 25, 2018

(51) Int. Cl.
  H02S 40/20 (2014.01)
  F21V 8/00 (2006.01)

(52) U.S. Cl.
  CPC ............ *H02S 40/20* (2014.12); *G02B 6/0015* (2013.01); *G02B 6/0076* (2013.01)

(58) Field of Classification Search
  CPC ..... H02S 40/20; H01L 31/0547; Y02E 10/52; G02B 6/0015; G02B 6/0076
  See application file for complete search history.

(56) References Cited

U.S. PATENT DOCUMENTS

| 9,535,253 | B2* | 1/2017 | Levola | .................... G02F 1/011 |
| 2005/0150542 | A1* | 7/2005 | Madan | .................. H01L 31/043 |
| | | | | 136/255 |
| 2009/0221111 | A1* | 9/2009 | Frolov | ............ H01L 31/022433 |
| | | | | 438/65 |
| 2010/0288352 | A1* | 11/2010 | Ji | ........................ H01L 31/0547 |
| | | | | 136/256 |
| 2011/0011445 | A1* | 1/2011 | Spencer | ............... G02B 3/0031 |
| | | | | 136/246 |
| 2014/0230897 | A1* | 8/2014 | Waldman | ............. G03H 1/0248 |
| | | | | 136/259 |
| 2018/0120483 | A1* | 5/2018 | Shimura | ............... E06B 3/6715 |
| 2018/0188542 | A1* | 7/2018 | Waldern | ............. G02B 27/0172 |

FOREIGN PATENT DOCUMENTS

WO    WO-2016182009 A1 * 11/2016 ............... G02B 5/32

* cited by examiner

*Primary Examiner* — Bethany L Martin
*Assistant Examiner* — Kourtney R S Carlson
(74) *Attorney, Agent, or Firm* — Weaver Austin Villeneuve & Sampson LLP (57) ABSTRACT

Techniques related to reclamation of energy leaking from waveguides are disclosed. One or more photovoltaic cells may receive light leaking from a waveguide at a first surface of the wave guide. The first surface may be opposite to a second surface at which an in-coupling element is located. The light leaking from the waveguide results from inefficiency in redirecting incoming light for propagation within the waveguide. The one or more photovoltaic cells may generate electric power from the light leaking from the waveguide.

20 Claims, 7 Drawing Sheets

RECLAMATION OF ENERGY LEAKING FROM WAVEGUIDES

BACKGROUND

The disclosure relates generally to near-eye display systems, and more specifically to reclamation of energy leaking from waveguides.

Near-eye display (NED) systems have garnered significant interest due to their suitability for various commercial and military uses. For example, NED systems have become popular for use with virtual reality and augmented reality applications. To make NED systems small and lightweight for users, many NED systems comprise waveguides that enable an increased field-of-view without a corresponding increase in the size and weight of a NED system. Typically, however, a small percentage, such as 20%, of incoming light is propagated within a waveguide, and the rest of the incoming light is wasted. Thus, NED systems often consume a significant amount of power, which may cause overheating and/or require large and heavy batteries to supply adequate power.

SUMMARY

This disclosure relates to reclamation of energy leaking from waveguides. Reclamation may be achieved using one or more photovoltaic cells that harvest the leaking energy and convert it into electric power. Described herein are various methods, apparatuses, and systems comprising means for performing reclamation of energy leaking from waveguides.

In some embodiments, the leaking energy is light leaking from a waveguide at a first surface of the waveguide. The first surface may be opposite to a second surface at which an in-coupling element is located. The light leaking from the waveguide may result from inefficiency in redirecting incoming light for propagation within the waveguide. One or more photovoltaic cells may be positioned such that they receive the light leaking from the waveguide and generate electric power from the light leaking from the waveguide.

In some embodiments, the one or more photovoltaic cells may correspond to a single photovoltaic cell configured to capture red, green, and blue light.

In some embodiments, the one or more photovoltaic cells may comprise a plurality of narrow-band photovoltaic cells. The plurality of narrow-band photovoltaic cells may include a first narrow-band photovoltaic cell configured to capture light having a wavelength within a first range and a second narrow-band photovoltaic cell configured to capture light having a wavelength within a second range. Each of the first narrow-band photovoltaic cell and the second narrow-band photovoltaic cell may have a planar shape, and the first narrow-band photovoltaic cell and the second narrow-band photovoltaic cell may be arranged in a stack. Additionally or alternatively, the first narrow-band photovoltaic cell may be composed of a material that is substantially transparent to light having a wavelength within the second range.

In some embodiments, the waveguide may be one of a plurality of waveguides. The plurality of waveguides may comprise a first waveguide configured to guide light having a wavelength within a first range and a second waveguide configured to guide light having a wavelength within a second range. Additionally or alternatively, the one or more photovoltaic cells may comprise a plurality of narrow-band photovoltaic cells that are interleaved with the plurality of waveguides.

In some embodiments, the one or more photovoltaic cells may be applied to the second surface as a coating.

BRIEF DESCRIPTION OF THE DRAWINGS

Illustrative embodiments are described with reference to the following figures.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Disclosed herein are techniques that enable reclamation of energy leaking from waveguides. Reclamation may be achieved using one or more photovoltaic cells that harvest the leaking energy and convert it into electric power. Thus, the leaking energy may be recycled to supply electric power, for example, to a NED system.

Figure 1:
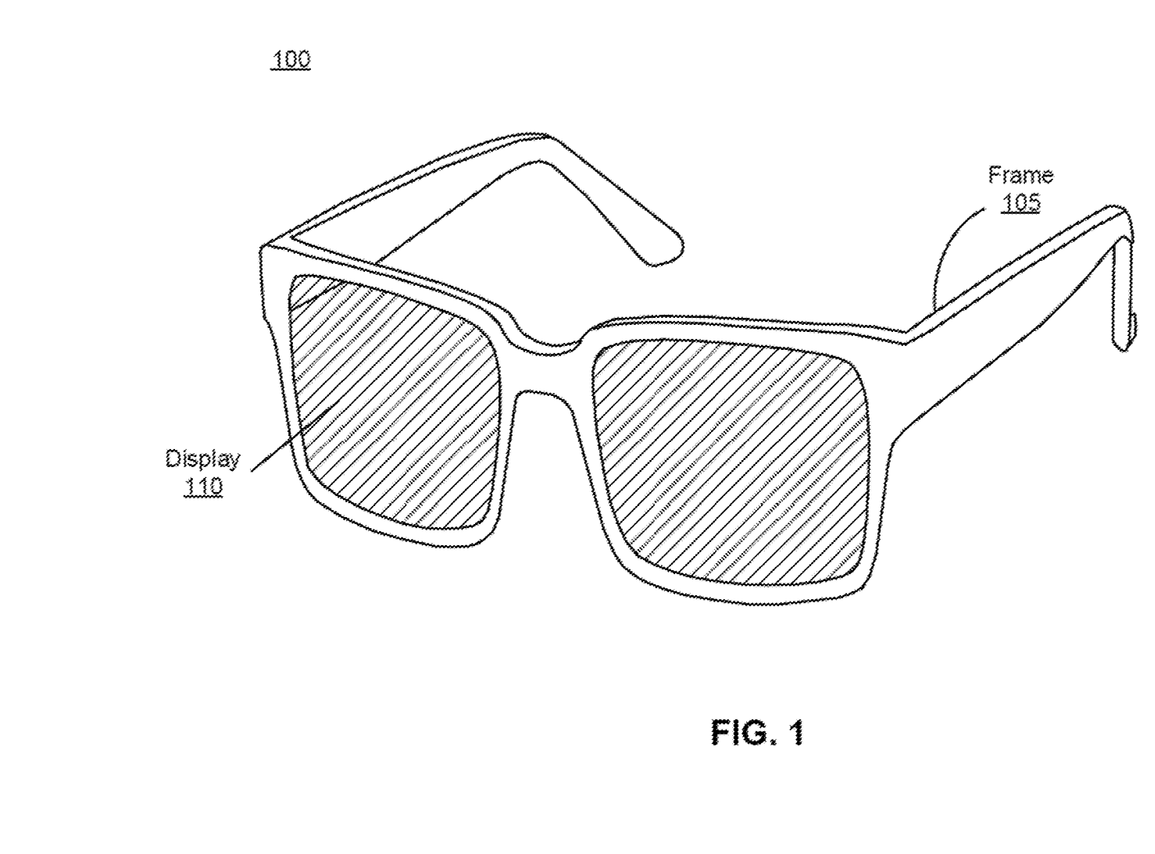
FIG. 1 illustrates an example near-eye display (NED) system.

FIG. 1 illustrates an example near-eye-display (NED) system 100. NED system 100 is merely one example of a system that can benefit from the techniques described herein. Thus, the techniques described herein should not be construed as being not limited in applicability to NED system 100.

NED system 100 may be used to present media, such as one or more images, video, and/or audio. In some embodiments, NED system 100 may be part of a virtual reality system, an augmented reality system, and/or a mixed reality system. In the example of FIG. 1, NED system 100 comprises a frame 105 and a display 110. Frame 105 may be used to secure display 110 to a user's face. Thus, display 110 may also be referred to as a head-mounted display (HMD). As will be described in greater detail below, display 110 may comprise one or more optical elements for presenting media to a user.

Although FIG. 1 illustrates NED system 100 as a pair of eye-wear glasses, it should be appreciated that NED system 100 is not limited to such an embodiment. For example, in some embodiments, NED system 100 may be a pair of goggles that seal out ambient light.

Figure 2:
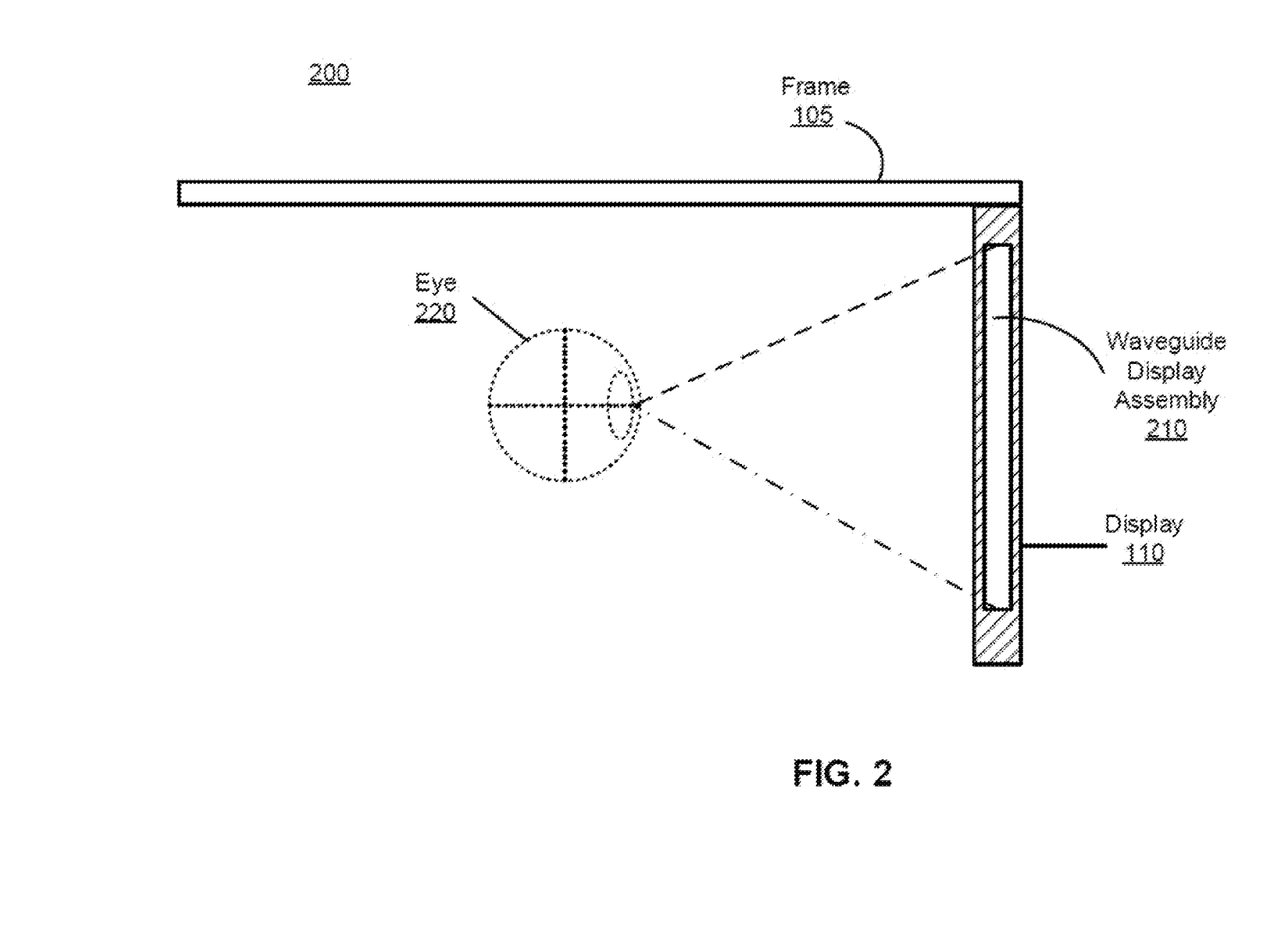
FIG. 2 illustrates a cross-section of the example NED illustrated in FIG. 1.

FIG. 2 illustrates a cross-section 200 of NED system 100. Display 110 may comprise a waveguide display assembly 210. Waveguide display assembly 210 may comprise one or more optical waveguides configured to redirect light toward a user's eye 220. Each waveguide may be composed of one or more substantially transparent materials, such as plastic and/or glass. As will be described in greater detail below, waveguide display assembly 210 may comprise multiple planar waveguides that are arranged in a "stack". As used herein, a stack refers to a parallel arrangement of planar components. Each waveguide in the stack may be configured to redirect a different wavelength range of light.

Figure 3:
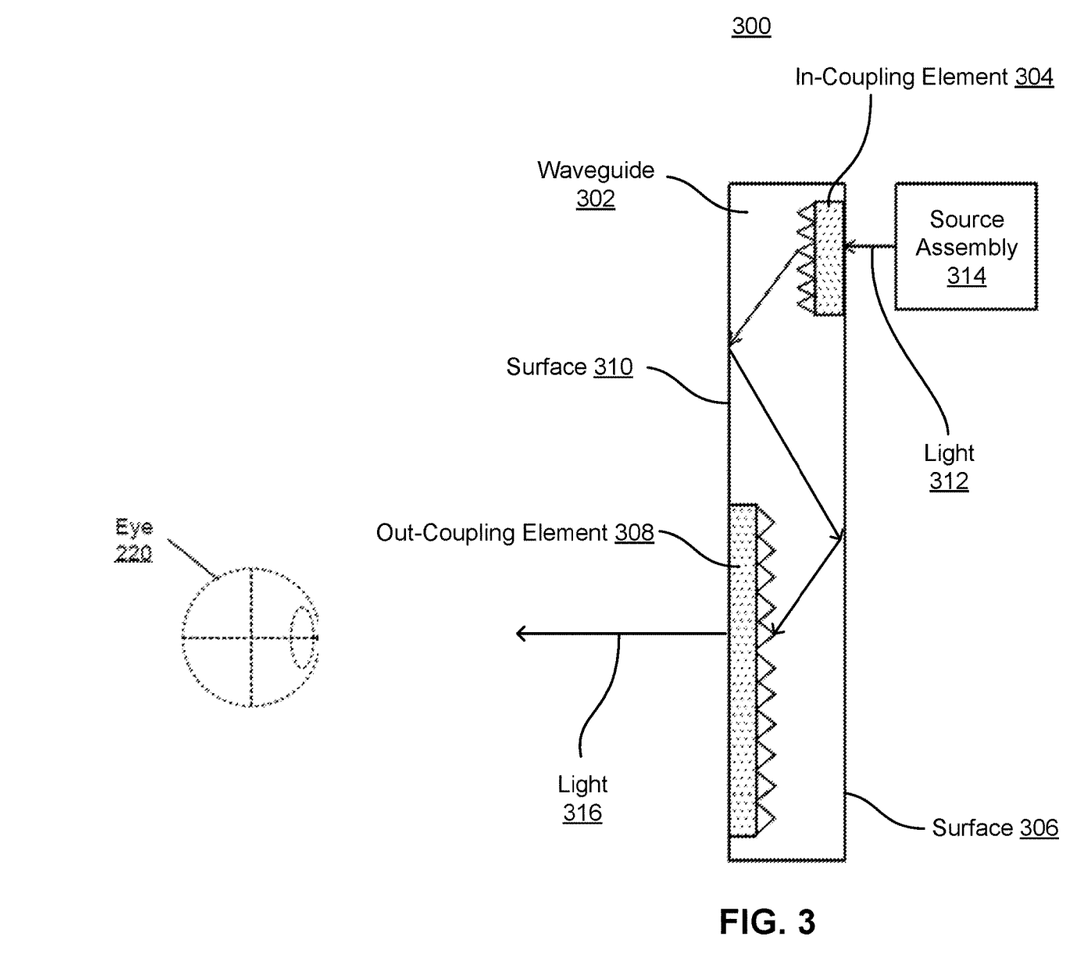
FIG. 3 illustrates an example waveguide display assembly.

FIG. 3 illustrates an example configuration 300 of waveguide display assembly 210 comprising a waveguide 302 and a source assembly 314. For the sake of clarity and ease of explanation, only one waveguide and one source assembly are illustrated in the example of FIG. 3. However, in some other configurations (including those illustrated in FIGS. 4-7), waveguide display assembly 210 may comprise multiple waveguides and/or multiple source assemblies. For example, waveguide display assembly 210 may comprise multiple source assemblies that each emit a different wavelength range of light, such as light having a red, green, or blue color.

Source assembly 314 may generate and output light 312 toward waveguide 302. Light 312 may be a continuous or pulsed beam of energy in the visible range of the electromagnetic spectrum. In some embodiments, source assembly 314 may comprise one or more light sources and one or more optical elements. Example light sources include, without limitation, a laser diode, a vertical cavity surface emitting laser, a light emitting diode, a super-luminescent light emitting diode, and/or a tunable laser. Example optical elements include, without limitation, a lens, a mirror, an aperture, and/or a grating.

Light 312 may enter waveguide 302 via an in-coupling element 304. Referring to FIG. 3, in-coupling element 304 is located at a surface 306 of waveguide 302. In-coupling element 304 may be a microstructure etched, formed, or otherwise positioned on surface 306. Examples of in-coupling element 304 include, without limitation, a diffraction grating, a holographic grating, one or more cascaded reflectors, one or more prismatic surface elements, a metamaterial lens or prism, and/or an array of holographic reflectors. In-coupling element 304 may be configured to redirect light 312 for propagation within waveguide 302. For example, in-coupling element 304 may refract, diffract, and/or reflect light 312 at such an angle that total internal reflection causes some of light 312 to propagate within waveguide 302 toward an out-coupling element 308.

Out-coupling element 308 may be configured to redirect light propagating within waveguide 302 toward eye 220. For example, out-coupling element 308 may cause light 316 to exit waveguide 302 via refraction, diffraction, and/or reflection. Out-coupling element 308 may be a microstructure etched, formed, or otherwise positioned on a surface 310 of waveguide 302. Examples of out-coupling element 308 include, without limitation, a diffraction grating, a holographic grating, one or more cascaded reflectors, one or more prismatic surface elements, a metamaterial lens or prism, and/or an array of holographic reflectors.

In the example of FIG. 3, out-coupling element 308 is located at surface 310 opposite to surface 306, where in-coupling element 304 is located. However, in some other configurations (including those illustrated in FIGS. 4-7), out-coupling element 308 and in-coupling element 304 may be located on the same surface of waveguide 302.

Although FIG. 3 illustrates out-coupling element 308 as being larger than in-coupling element 304, it should be appreciated that out-coupling element 308 can have any size relative to in-coupling element 304. For example, in some embodiments, in-coupling element 304 and out-coupling element 308 may have the same size.

For the sake of clarity and ease of explanation, only one out-coupling element 308 is illustrated in the example of FIG. 3. However, in some other configurations (including those illustrated in FIGS. 4-7), waveguide 302 may comprise multiple out-coupling elements. For example, waveguide 302 may have another out-coupling element located at surface 306 and substantially facing out-coupling element 308.

Waveguide 302 may output light 316 with an exiting pupil that has been expanded. The size change of the pupil may be proportional to the amount by which out-coupling element 308 is larger than in-coupling element 304.

Figure 4:
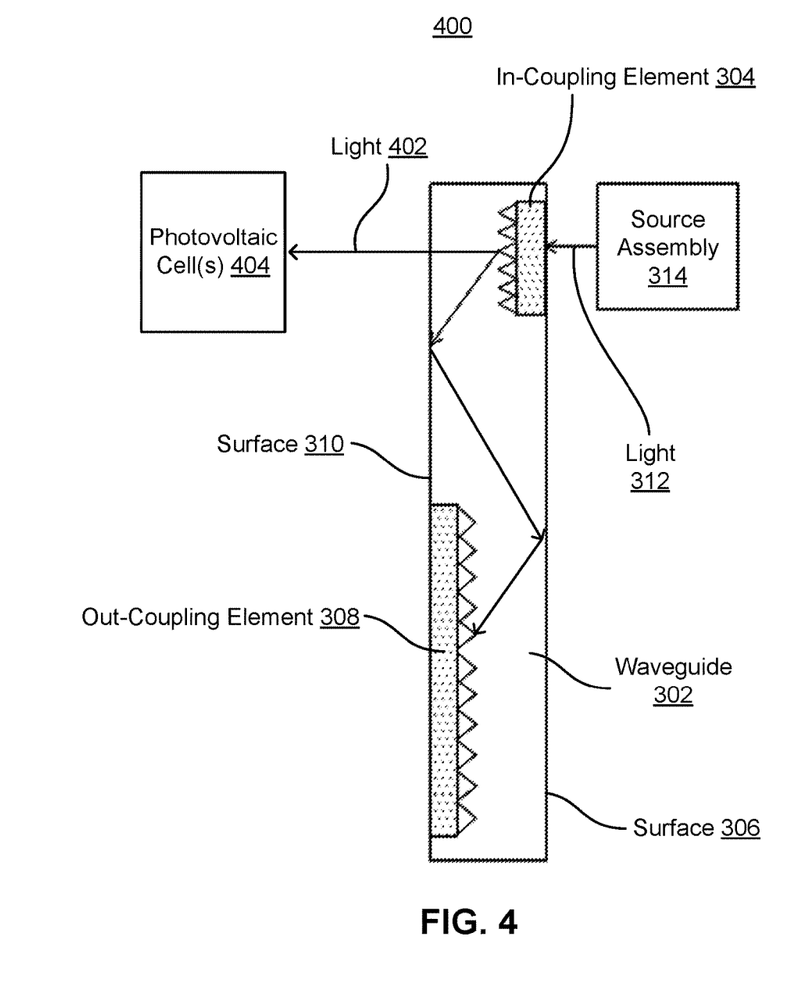
FIG. 4 illustrates an example approach for reclamation of energy leaking from a waveguide.

However, as mentioned above, a small percentage of light 312 is propagated within waveguide 302, and the remaining percentage of light 312 is wasted. FIG. 4 illustrates this wasted light as light 402. As illustrated in the example configuration 400 of FIG. 4, light 402 exits waveguide 302 without reaching out-coupling element 308. Thus, light 402 can be described as "leaking" from waveguide 302.

Light 402 may leak from waveguide 302 due to inefficiency in redirecting light 312 for propagation within waveguide 302. This inefficiency may result from interference between redirected light and incoming light at in-coupling element 304 (e.g., the in-coupled light may hit in-coupling element 304 again from inside waveguide 302). For example, light L1 may enter waveguide 302 near the top of in-coupling element 304, which redirects L1 at an angle sufficient for total internal reflection at surface 310. However, L1 may be reflected back to in-coupling element 304, where L1 interferes with redirection of light L2. As a result, some of L2 traverses waveguide 302 toward out-coupling element 308, but most of L2 leaks from waveguide 302 at a region of surface 310 opposite to in-coupling element 304. Some studies indicate that light 402 can be as much as 80% of light 312.

To harvest this wasted energy, photovoltaic cell(s) 404 may be positioned such that they receive light 402 and convert it into electric power for NED system 100. For example, in some embodiments, photovoltaic cell(s) 404 may comprise a thin film or coating applied to at least that part of surface 310 opposite to in-coupling element 304. Assuming that source assembly 314 outputs light 312 with an efficiency of 40% and that photovoltaic cell(s) 404 generate power with an efficiency of 50%, harvesting the wasted 80% of light 312 would enable recycling 16% of the power used to generate light 312. This savings can be used to satisfy some of the power requirements of NED system 100, thereby mitigating issues concerning overheating and/or enabling battery size and weight reductions.

Figure 5:
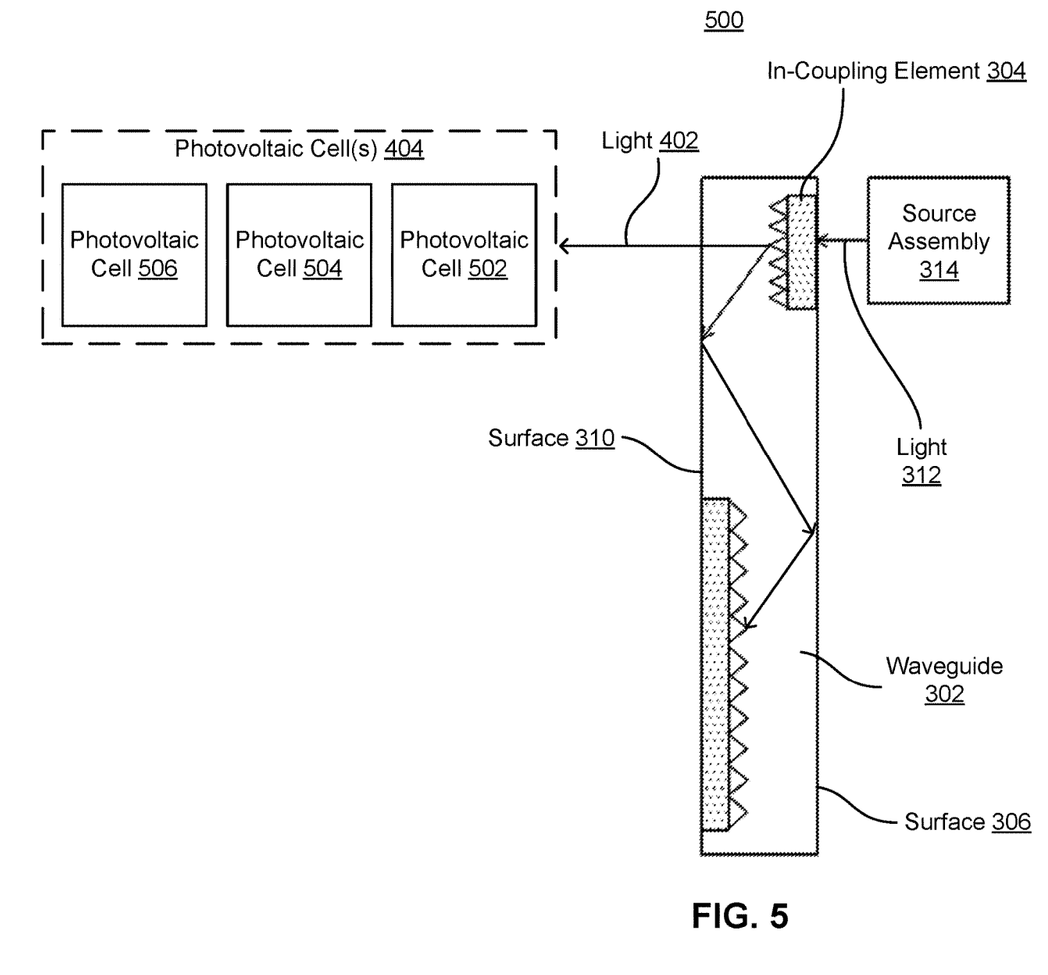
FIG. 5 illustrates an example stack of narrow-band photovoltaic cells involved in reclamation of energy leaking from a waveguide.

However, to increase the amount of power that is recycled, photovoltaic cell(s) 404 may comprise a plurality of narrow-band photovoltaic cells. FIG. 5 illustrates an example configuration 500 comprising a stack of narrow-band photovoltaic cells 502-506. Compared to a broadband photovoltaic cell, a narrow-band photovoltaic cell may be configured to capture light within a smaller wavelength range. For example, a broadband photovoltaic cell may be configured to capture light having wavelengths between 400 and 1200 nanometers, whereas a narrow-band photovoltaic cell may be configured to capture light within a wavelength range of 30 nanometers. Thus, a narrow-band photovoltaic cell may generate power more efficiently than a broadband photovoltaic cell.

In the example of FIG. 5, three narrow-band photovoltaic cells are illustrated. Each narrow-band photovoltaic cell may be configured to capture light within a different wavelength range. For example, photovoltaic cell 502 may be configured to capture blue light, photovoltaic cell 504 may be configured to capture green light, and photovoltaic cell 506 may be configured to capture red light. However, in some other configurations (including those illustrated in FIGS. 5-7), a different number of narrow-band photovoltaic cells may be configured to capture light within different wavelength ranges. For example, only two different types of narrow-band photovoltaic cells may be used—one configured to capture blue-green light and another configured to capture green-red light.

One or more narrow-band photovoltaic cells may be composed of a material that is substantially transparent to light within a wavelength range that another photovoltaic cell is configured to capture. For example, photovoltaic cell 502 may be substantially transparent to green and red light, whereas photovoltaic cell 504 may be substantially transparent to red light. This enables one or more wavelength ranges of light 402 to pass through one or more photovoltaic cells of a stack of narrow-band photovoltaic cells.

Although not shown in FIG. 5, each of photovoltaic cells 502-506 may be separately connected to a circuit. In other words, photovoltaic cell 502 may have a first pair of positive and negative terminals, photovoltaic cell 504 may have a second pair of positive and negative terminals, and photovoltaic cell 506 may have a third pair of positive and negative terminals. Separately connecting each photovoltaic cell enables a more robust and efficient approach for harvesting light.

For example, photovoltaic cells 502-506 may be configured to capture blue, green, and red light, respectively. Connecting photovoltaic cells 502-506 in series would work only if they capture light having blue, green, and red color components. However, if they capture light missing even one of these color components, then the circuit would not be complete. In contrast, separately connected photovoltaic cells 502-506 would not have an open circuit issue even if they capture light missing one or more color components.

Figure 6:
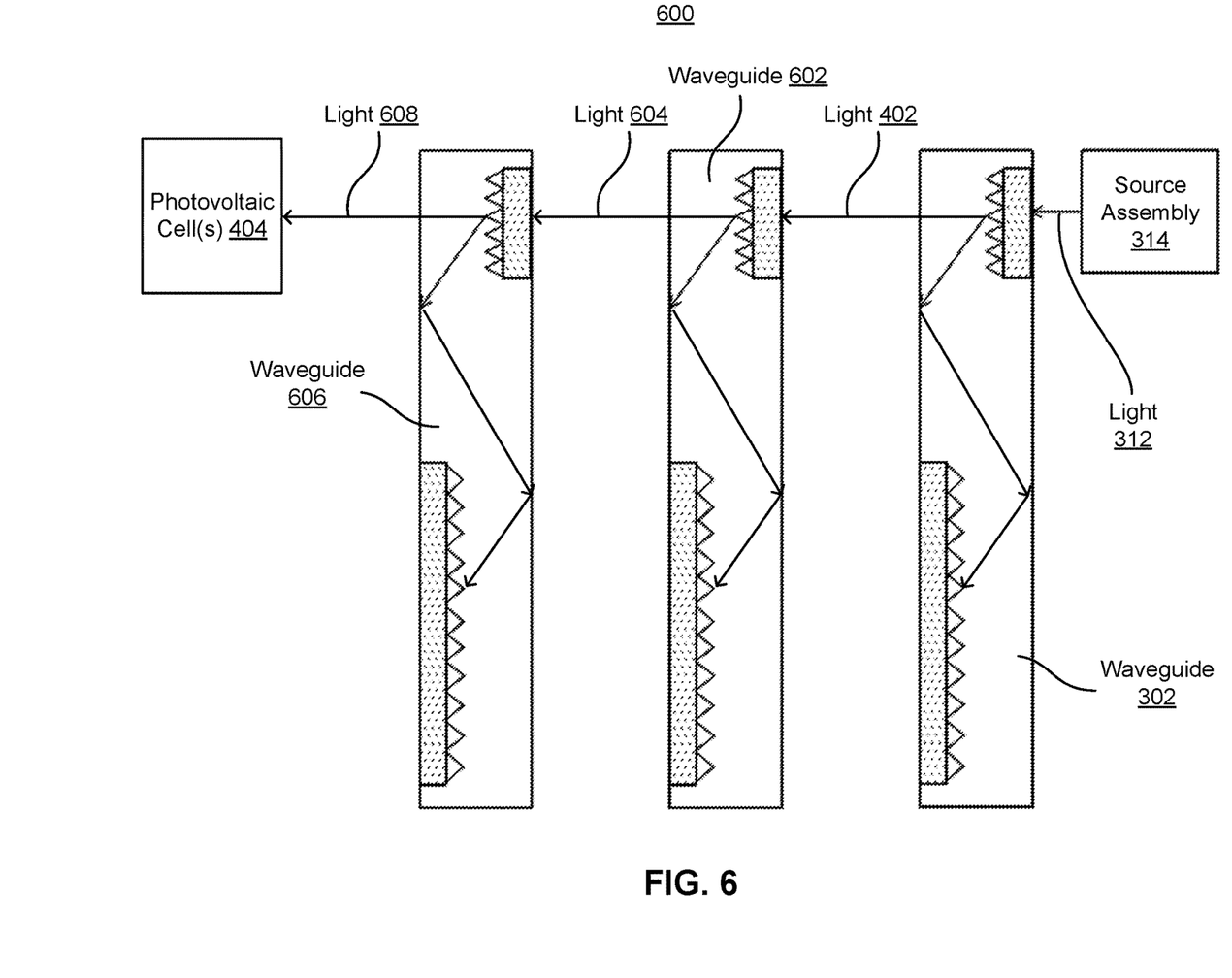
FIG. 6 illustrates an example approach for reclamation of energy leaking from a plurality of waveguides.

FIG. 6 illustrates a variation of FIGS. 4 and 5 involving a plurality of waveguides comprising waveguides 302, 602, and 606. In the example configuration 600 of FIG. 6, waveguides 302, 602, and 606 are arranged in a stack. Each waveguide may be configured to guide light within a different wavelength range. For example, waveguide 302 may be configured to guide blue light, waveguide 602 may be configured to guide green light, and waveguide 606 may be configured to guide red light. Although three waveguides are illustrated in the example of FIG. 6, it should be appreciated that a stack of waveguides may comprise any number of waveguides configured to guide light within different wavelength ranges. For example, a stack of duplexed waveguides may comprise a first waveguide configured to guide blue-green light and a second waveguide configured to guide green-red light.

Thus, photovoltaic cell(s) 404 may harvest some or all of light 402, 604, and 608 leaking from waveguides 302, 602, and 606, respectively. In some embodiments, photovoltaic cell(s) 404 may comprise a stack of narrow-band photovoltaic cells for harvesting some or all of light 402, 604, and 608 with increased efficiency.

In some embodiments, waveguides may be separated by filters. For example, waveguides 302 and 602 may be separated by a filter for blue light, and waveguides 602 and 606 may be separated by a filter for green light.

Figure 7:
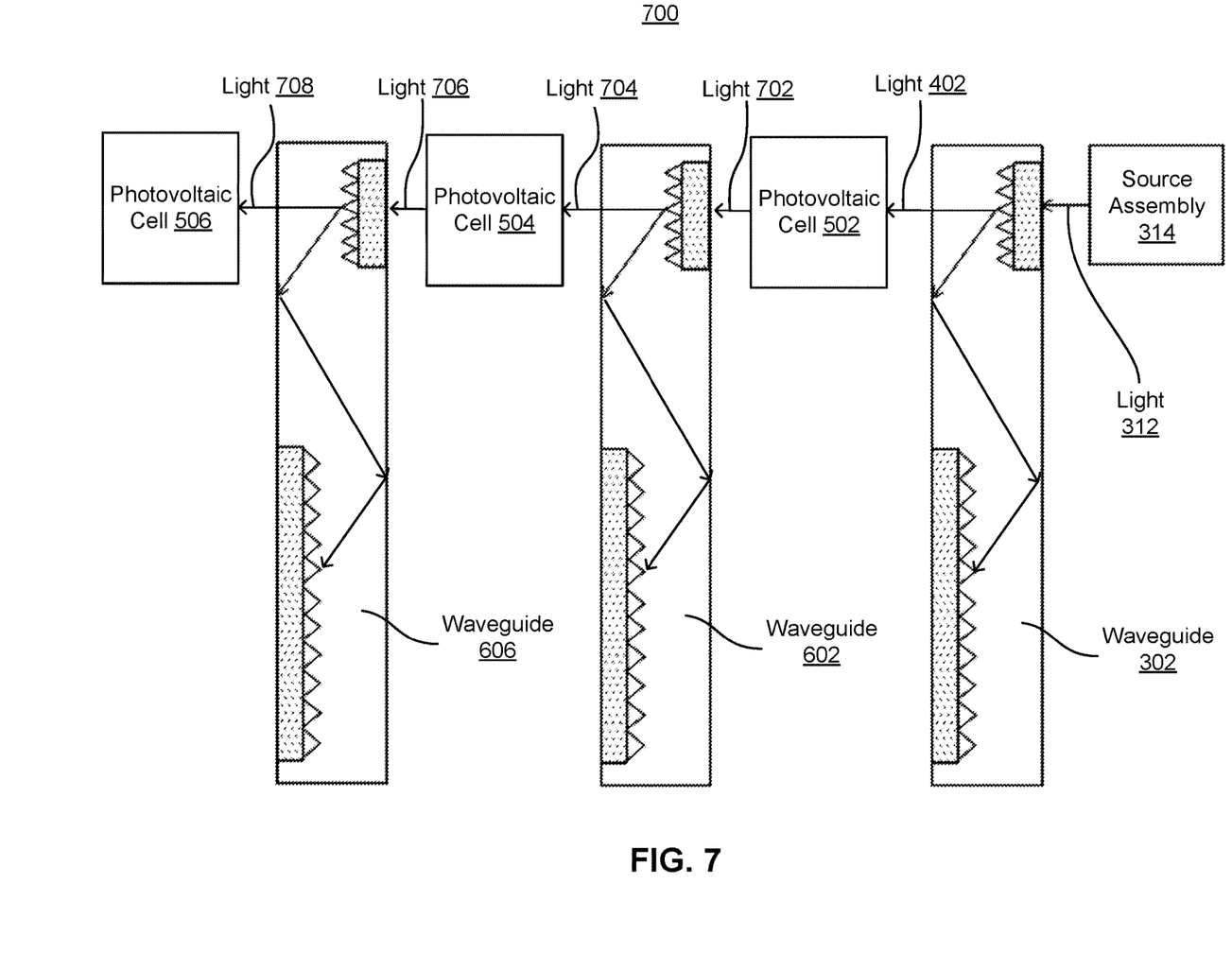
FIG. 7 illustrates an example approach for reclamation of energy leaking from a plurality of waveguides that are interleaved with a plurality of narrow-band photovoltaic cells.

In some embodiments, narrow-band photovoltaic cells may serve as filters separating waveguides. FIG. 7 illustrates an example configuration 700 comprising a stack of narrow-band photovoltaic cells 502-506 interleaved with a stack of waveguides 302, 602, and 606. In the example of FIG. 7, three narrow-band photovoltaic cells are illustrated as being interleaved with three waveguides. However, it should be appreciated that any number of narrow-band photovoltaic cells may be interleaved with any number of waveguides.

Each narrow-band photovoltaic cell may be configured to capture light within a different wavelength range. For example, photovoltaic cell 502 may be configured to capture blue light, photovoltaic cell 504 may be configured to capture green light, and photovoltaic cell 506 may be configured to capture red light. Although not shown in FIG. 7, each of photovoltaic cells 502-506 may be separately connected to a circuit.

One or more narrow-band photovoltaic cells may be composed of a material that is substantially transparent to light within a wavelength range that another photovoltaic cell is configured to capture. For example, photovoltaic cell 502 may be substantially transparent to green and red light, whereas photovoltaic cell 504 may be substantially transparent to red light.

Each waveguide may be configured to guide light within a different wavelength range. For example, waveguide 302 may be configured to guide blue light, waveguide 602 may be configured to guide green light, and waveguide 606 may be configured to guide red light.

Thus, photovoltaic cells 502-506 may harvest light 402, 704, and 708 leaking from waveguides 302, 602, and 606, respectively. For example, light 312 may comprise blue, green, and red color components. Some of the blue color component may be propagated within waveguide 302, and the rest of the blue color component may be leaked as light 402, which also comprises green and red color components. Photovoltaic cell 502 may harvest the rest of the blue color component from light 402 such that light 702 comprises green and red color components but not a blue color component. Some of the green color component may be propagated within waveguide 602, and the rest of the green color component may be leaked as light 704, which also comprises a red color component. Photovoltaic cell 504 may harvest the rest of the green color component from light 704 such that light 706 comprises a red color component but not a green color component. Some of the red color component may be propagated within waveguide 606, and the rest of the red color component may be leaked as light 708. Photovoltaic cell 506 may harvest the rest of the red color component from light 708.

As mentioned above, some other configurations may comprise a different number of narrow-band photovoltaic cells interleaved with waveguides. For example, two different narrow-band photovoltaic cells—one configured to capture blue-green light and another configured to capture green-red light—may be interleaved with a stack of duplexed waveguides—one configured to guide blue-green light and another configured to guide green-red light.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   receiving, at one or more photovoltaic cells, light leaking from a waveguide at a first surface of the waveguide, the first surface being opposite to a second surface at which an in-coupling element is located, wherein the light leaking from the waveguide results from inefficiency of the in-coupling element in redirecting incoming light entering the waveguide for propagation within the waveguide, the inefficiency of the in-coupling element resulting in (1) a first portion of the incoming light being redirected for propagation within the waveguide and (2) a second portion of the incoming light being directed, as the light leaking from the waveguide, toward the one or more photovoltaic cells,
   wherein the first portion of the incoming light is redirected for propagation within the waveguide toward an out-coupling element, the out-coupling element configured to redirect the light propagated within the waveguide toward an eye of a user,
   wherein the second portion of the incoming light is directed, without reflection, toward the one or more photovoltaic cells; and
   generating, at the one or more photovoltaic cells, electric power from the light leaking from the waveguide.

2. The method of claim 1, wherein the one or more photovoltaic cells comprise a plurality of narrow-band photovoltaic cells, including a first narrow-band photovoltaic cell configured to capture light having a wavelength within a first range and a second narrow-band photovoltaic cell configured to capture light having a wavelength within a second range.

3. The method of claim 2, wherein each of the first narrow-band photovoltaic cell and the second narrow-band photovoltaic cell has a planar shape, and the first narrow-band photovoltaic cell and the second narrow-band photovoltaic cell are arranged in a stack.

4. The method of claim 2, wherein the first narrow-band photovoltaic cell is composed of a material that is substantially transparent to light having a wavelength within the second range.

5. The method of claim 1, wherein the waveguide is one of a plurality of waveguides comprising a first waveguide configured to guide light having a wavelength within a first range and a second waveguide configured to guide light having a wavelength within a second range.

6. The method of claim 5, wherein the one or more photovoltaic cells comprise a plurality of narrow-band photovoltaic cells that are interleaved with the plurality of waveguides.

7. The method of claim 1, wherein the one or more photovoltaic cells are applied to the second surface as a coating.

8. The method of claim 1, wherein the one or more photovoltaic cells correspond to a single photovoltaic cell configured to capture red, green, and blue light.

9. An apparatus comprising:
a waveguide having a first surface at which an in-coupling element is located; and
one or more photovoltaic cells configured to:
receive light leaking from the waveguide at a second surface of the waveguide, the second surface being opposite to the first surface, wherein the light leaking from the waveguide results from inefficiency of the in-coupling element in redirecting incoming light entering the waveguide for propagation within the waveguide, the inefficiency of the in-coupling element resulting in (1) a first portion of the incoming light being redirected for propagation within the waveguide and (2) a second portion of the incoming light being directed, as the light leaking from the waveguide, toward the one or more photovoltaic cells, and
generate electric power based from the light leaking from the waveguide,
wherein the in-coupling element is configured to redirect the first portion of the incoming light for propagation within the waveguide toward an out-coupling element, the out-coupling element configured to redirect the light propagated within the waveguide toward an eye of a user,
wherein the in-coming element is configured to direct the second portion of the incoming light, without reflection, toward the one or more photovoltaic cells.

10. The apparatus of claim 9, wherein the one or more photovoltaic cells comprise a plurality of narrow-band photovoltaic cells, including a first narrow-band photovoltaic cell configured to capture light having a wavelength within a first range and a second narrow-band photovoltaic cell configured to capture light having a wavelength within a second range.

11. The apparatus of claim 10, wherein each of the first narrow-band photovoltaic cell and the second narrow-band photovoltaic cell has a planar shape, and the first narrow-band photovoltaic cell and the second narrow-band photovoltaic cell are arranged in a stack.

12. The apparatus of claim 10, wherein the first narrow-band photovoltaic cell is composed of a material that is substantially transparent to light having a wavelength within the second range.

13. The apparatus of claim 9, wherein the waveguide is one of a plurality of waveguides comprising a first waveguide configured to guide light having a wavelength within a first range and a second waveguide configured to guide light having a wavelength within a second range.

14. The apparatus of claim 13, wherein the one or more photovoltaic cells comprise a plurality of narrow-band photovoltaic cells that are interleaved with the plurality of waveguides.

15. A system comprising:
means for guiding light, the means having a first surface at which an in-coupling element is located;
means for receiving light leaking from a second surface of the means for guiding light, the second surface being opposite to the first surface, wherein the light leaking from the means for guiding light resulting from inefficiency of the in-coupling element in redirecting incoming light entering the waveguide for propagation within the means for guiding light; and
means for generating electric power from the light leaking from the means for guiding light,
wherein the inefficiency of the in-coupling element results in (1) a first portion of the incoming light being redirected for propagation within the means for guiding light and (2) a second portion of the incoming light being directed, as the light leaking from the second surface of the means for guiding light, toward the means for generating electric power,
wherein the in-coupling element is configured to redirect the first portion of the incoming light for propagation within the means for guiding light toward an out-coupling element, the out-coupling element configured to redirect the light propagated within the means for guiding light toward an eye of a user,
wherein the in-coming element is configured to direct the second portion of the incoming light, without reflection, toward the means for generating electric power.

16. The system of claim 15, wherein the means for receiving light comprises a first means for capturing light having a wavelength within a first range and a second means for capturing light having a wavelength within a second range.

17. The system of claim 16, wherein each of the first means and the second means has a planar shape, and the first means and the second means are arranged in a stack.

18. The system of claim 16, wherein the first means is composed of a material that is substantially transparent to light having a wavelength within the second range.

19. The system of claim 15, wherein the means for guiding light is one of a plurality of means for guiding light comprising a first means that guides light having a wavelength within a first range and a second means that guides light having a wavelength within a second range.

20. The system of claim 19, wherein the means for receiving light comprises a plurality of means for receiving light that are interleaved with the plurality of means for guiding light.

* * * * *